June 2, 1959 L. J. DANIS 2,888,740
COMPOSITE DUCTILE WIRE
Filed July 15, 1952
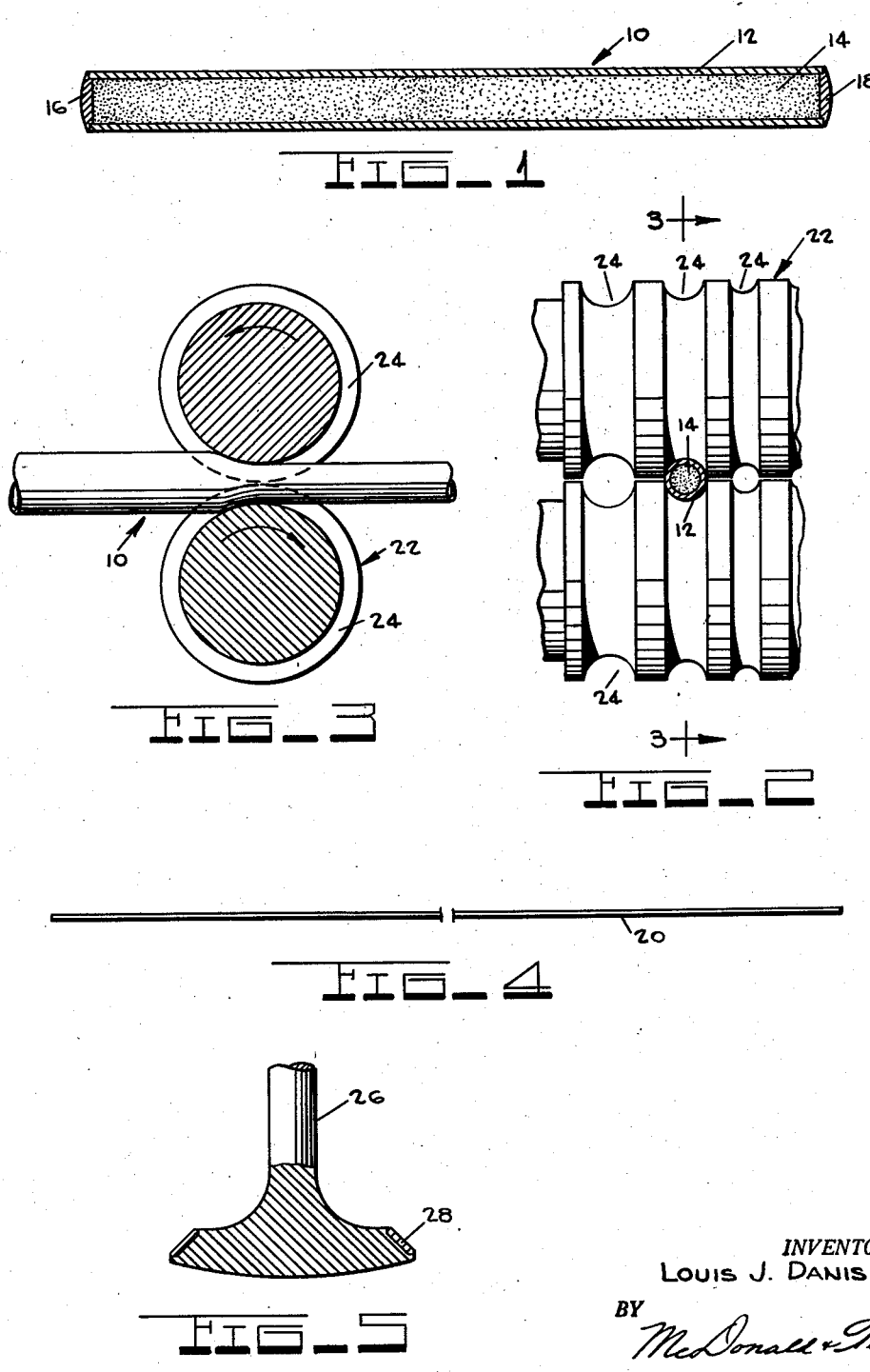
INVENTOR.
LOUIS J. DANIS
BY
ATTORNEYS

United States Patent Office 2,888,740
Patented June 2, 1959

2,888,740

COMPOSITE DUCTILE WIRE

Louis J. Danis, Detroit, Mich., assignor to Eaton Manufacturing Company, Cleveland, Ohio, a corporation of Ohio Application July 15, 1952, Serial No. 299,041

5 Claims. (Cl. 29—191.2)

This invention relates to composite ductile wire and a method of manufacture thereof.

Broadly the invention comprehends the provision of a composite ductile wire and method of manufacture thereof said wire being applicable by semi- and fully-automatic shielded arc welding methods to engine valves or the like so as to provide non-ductile heat and corrosion-resistant or wear and abrasion-resistant facings. As a means of affording the desired facings through the use of said wire it is necessary that the wire be made of a tube filled with powdered or granular metals and wherein a proper desired alloy analysis is obtained through the utilization of a tube or sheath of particular composition and a fill of particular analysis proportioned relative to the tube or sheath.

Although composite ductile wire comprising a ductile tube and ductile core of unlike composition to the casing has been produced adapted for varied uses, none up to the present time has been devised or fabricated wherein the casing and core thereof remain ductile throughout their process of manufacture to desired size and whereupon in the welding application thereof it becomes non-ductile and provides a heat and corrosion-resistant or wear and abrasion-resistant facing.

Among the principal objects is the provision of and method of manufacture of a composite ductile wire, that;

(1) Is produced from a tube of ductile hot workable material and a core of powdered or granular metals and metalloids, which core remains ductile and hot workable as a mass until the final ductile wire is produced;

(2) Can be effectively utilized by automatic welding apparatus in the application of the wire as a facing material upon an article;

(3) Produces a heat and corrosion-resistant or wear and abrasion-resistant non-ductile facing when welded to an article which it is to become a part of;

(4) Is economical to produce and use and which provides for the economical production of valves and the like, requiring hard facings, when welded thereto as said facings;

(5) Provides upon the welding application of the wire, a facing of desired alloy wherein the useful characteristics thereof are dependent on the various metals and metalloids going to make up the tube and powder fill of which the wire is fabricated; and (6) Includes the steps of providing a tube of substantially short length and known metallic composition; capping one end of the tube by welding or otherwise securing a plug thereto; compactly filling the tube with suitable metallic or metalloid powders or granules whereby together with the tube an end product desired facing alloy is provided in the welding application of the wire; capping the open end of the tube; and then hot and cold working the tube and filled core thereof to desired wire size.

Other objects and advantages of the invention will appear from the following description taken in connection with the drawings forming a part of the specification, and in which:

Fig. 1 is a cross-sectional view of a powder or granule filled and end capped tube, constituting a basic precept of this invention;

Fig. 2 is a fragmentary end view of a conventional type of rolling apparatus for rolling the tube of Fig. 1 to reduced size;

Fig. 3 is a partly fragmentary side elevation view of a rolling operation, and apparatus therefor, as performed upon the tube of Fig. 1, taken along lines 3—3 of Fig. 2;

Fig. 4 is a side elevation view of a fragmentary portion of finished size composite ductile wire produced from the tube of Fig. 1; and Fig. 5 is a partly cross-sectionalized fragmentary portion of a valve to which the wire is applied by a welding operation to form a hard facing therefor.

The presently desired composite ductile wire and method of manufacture thereof was developed primarily for the purpose of providing an economical and practical manner of applying hard facings to valves of internal combustion engines or other articles requiring heat and corrosion or wear and abrasion resistant facings. Suitable hard facing alloys of the well known Eatonite and Stellite type which are extensively used in the production of internal combustion engines have compositions which make impossible their manufacture as a prealloyed ductile wire suitable for deposition by automatic welding apparatus due primarily to the fact that as manufactured up to the present, these alloys are not hot and cold workable. As a consequence thereof other methods of application thereof in the use of said alloys in rod form have resulted in the requirement of the application of an excess amount of material for a particular operation, and faulty welds, resulting in high percentage of scrapping and a resultant high cost of production of said valves or articles to be faced.

By reason of the presently produced wire hard facings of Eatonite and Stellite or the like can be obtained with facility and economy. As a means of obtaining the desirable alloy constituency of Eatonite and Stellite without the previous shortcomings of ease in the application thereof for the purpose intended, a wire is produced having an analysis identical to the desired alloy hard facing to be produced. As such the wire comprises a ductile tube of known metallic composition or alloy filled with suitable metallic or metalloid powders or granules whereby through the proportionating of the powders or granules to one another and to the tube, a desired analysis is obtained. In so providing a ductile tube and utilizing powdered or granular metals, a ductile composite body is formed whereupon through the compacting of the powders or granules in the tube and with the tube ends capped, the body can be progressively hot and cold worked to desired wire size with a maintenance of substantially a uniform alloy analysis throughout the usable length of the wire. The wire, as produced, after having the capped ends removed therefrom is ready for use, preferably from a coil. The composite ductile wire is readily adaptable to use in automatic welding apparatus of the shielded arc type wherein as the consumable electrode of a welding apparatus it can be rapidly and effectively deposited upon the article which it is desired to apply a hard facing.

Referring to the drawings for more specific details of the invention 10 represents generally a tubular body or billet comprising a tube or sheath 12, a powder or granular material fill or core 14, and opposite end caps or plugs 16 and 18.

Tube 12 which is to be ductile and hot workable can be made from any of several different metals or alloys such as nickel or nickel base alloy, cobalt or cobalt alloy, iron or stainless steel whereas the fill or core 14 is to be made of mixtures of metals or metalloids which together with the tube will provide a desirable hard facing alloy when welding is applied. These metals or metalloids are preferably chromium, tungsten, cobalt, carbon, aluminum, boron, silicon and manganese, although many others might be used depending on the desired end properties and characteristics of the hard facing non-ductile alloy.

The following are some of the typical alloy compositions that can be utilized:

| Alloy | Composition | Illustrative Method of Making Tube to be Hot Rolled and Cold Drawn to desired Wire Size |
|---|---|---|
| A<br>Nickel base Heat and Corrosion Resistant Facing. | Ni 35–75%<br>Cr 15–35%<br>W 0–25%<br>Co 0–20%<br>C 0.3–4%<br>Others 20% max.[1] | Nickel or 80–20 Ni Cr tube, filled with mixture of Cr, Ni, Fe, C, Co, and W powder and others to yield desired non-ductile composition after welding, after hot and cold work processing of ductile wire. |
| B<br>Cobalt Base Heat and Corrosion Resistant Alloy. | Co 40–70%<br>Cr 20–37%<br>W 0–30%<br>C .2–4%<br>Others 20% max.[1] | Cobalt tube, or ductile cobalt alloy tube, filled with mixture of Co, Fe, Cr, C, W powder, and others, to yield desired non-ductile composition after hot and cold work processing ductile wire processing. |
| C<br>Iron Base Heat and Abrasion Resistant Alloy. | Fe 50–90%<br>Cr 5–40%<br>C 1–5%<br>W 0–20%<br>Others 20% max.[1] | Iron or stainless tube, filled with mixture of Fe, Cr, C, W powders and others, to yield desired non-ductile composition after welding, following hot and cold work processing of ductile wire. |
| D<br>Tungsten Base Abrasion Resistant Alloy. | W 35–95%<br>C 1–7%<br>Co 4–20%<br>Others 40% max.[1] | Cobalt tube, or ductile cobalt alloy tube, filled with mixture of W, C, Fe, Co and/or others, to yield non-ductile WC+matrix type hard facings, following hot and cold work processing of ductile wire. |

[1] These may be Al, B, Si, Mn, etc. which may be added to enhance free flow or physical properties of welded hard facing.

In the fabrication of composite ductile wire 20, tube 12 is made for example of a wall thickness of .100 inch diameter of .5 inch O.D. and .3 inch I.D. and of any suitable length such that it can be conveniently handled in an initial rolling operation and subsequent drawing operations to produce a coil of composite ductile wire of suitable length for the automatic welding production of hard facing of articles. Tube 12 next has one end capped or sealed effectively by plug 16 wherein plug 16 is welded or otherwise fixedly secured thereto. A ductile and compressible powder or granular mixture of metals of metalloids of known composition are next inserted in the tube and compacted therein to predetermined density so as to obtain the desired proportionate analysis of fill to tube. When the tube is properly filled, plug 18 is then fixedly secured to the open end of the tube so as together with plug 16 to effectively seal the fill or core within the tube and thus insure against its being displaced therefrom.

The body or billet 10 is next progressively hot worked and then cold worked to final wire diameter of approximately .05 inch whereupon it is appropriately coiled ready for applicational use. In so reducing the tube and filling from its original size to the aforesaid wire size approximately a 90% reduction in size is achieved. Fig. 3 illustrates a step in the processing of the wire to size wherein as billet 10 is passed through roller apparatus 22 it is swaged or rolled to a progressively smaller diameter whereupon after it has obtained a predetermined size it is drawn to a much smaller wire size. With the advance of the billet 10 through the progressive dies 24 of roller apparatus 22 it loses its billet identity and assumes a wire size desirable for its subsequent cold drawing to final size. Prior to the use of the produced wire, a length of the wire at each end thereof is required to be removed since this constitutes the plug 16 and 18 rolled to wire size. This is done so that the accidental application of the initial length of the wire cannot be made.

Fig. 5 illustrates an internal combustion engine valve 26 to which a non-ductile hard facing 28 has been applied, effective, in the case of the use of either an Eatonite or Stellite alloy analysis, to provide heat and corrosion resistance.

Although the presently devised wire has been defined with regard to the specific application thereof as hard facings of valves and the like, it is conceivably possible that it can be equally as well applied to other uses through the modification of the constituent metals or alloys utilized in the fabrication thereof. It is thus the province of this invention to include within its scope composite coilable ductile wire produced from hot and cold workable raw material which upon the welding application thereof the constituent metals or alloys thereof become alloyed together to form a non-ductile body or surface.

The following illustrates an example of analysis determination in the production of wire as presently devised.

Analysis determination

Powder mix calculations in relation to material content of tube.

[Nickel-chromium tube analysis—80% nickel+20% chromium.]

Tube:
Nichrome—80% nickel + 20% chromium.    114.40 grams—54.7% nickel.
                                       28.60 grams—13.51% chromium.
Powder_____ 32.60 grams—15.51% chromium.
Powder_____ 29.30 grams—14.0% tungsten.
Powder_____ 4.85 grams— 2.3% carbon.

Material analysis by percentage:                                   Percent
Nickel_____ 54.7
Chromium_____ 29
Tungsten_____ 14
Carbon_____ 2.3

This analysis falls within the range of Eatonite as presently employed in the hard facing of engine valves.

What I claim is:

1. The method of making composite coilable ductile wire comprising the provision of a hot and cold workable tube of predetermined size, wall thickness and metallic composition, sealing off one end of the tube, compacting a metallic powder ductile mixture, of an analysis when alloyed with the tube to provide a non-ductile body, in the bore of the tube, sealing off the unsealed end of the tube, hot rolling the tube and mixture to reduced diameter and increased length, and then cold drawing the hot rolled assembly to further decreased diameter and increased length.

2. A composite coilable ductile wire comprising a ductile tube, having an analysis of nickel and chromium, and small metallic ductile particles filling the tube having a combined analysis of chromium, tungsten and carbon, a combined analysis of the tube and particles when alloyed together forming a non-ductile body.

3. A composite coilable ductile wire, adaptable for use in automatic welding apparatus of the shielded arc type for applying hard facings on valves and the like, comprising a ductile tube made from one or more of the class of metals or alloys of nickel, chromium, cobalt, iron and stainless steel, and metallic particles filling the tube, each particle in itself being ductile and said particles as a group being ductile and of a combined composition such that when alloyed with the tube, in the striking of a welding arc to the wire, a non-ductile hard facing body is formed as a result of the alloying of the metals or alloys of the tube and particles.

4. A composite coilable ductile wire comprising a metallic tube of a metallic composition that is capable of being worked and effective of being greatly reduced in cross-sectional area and a plurality of metallic composition particles filling the tube capable of being worked and of being greatly reduced in cross-sectional area, said particles together with the tube upon the alloying thereof forming a non-ductile metallic body.

5. The method of making composite coilable ductile wire comprising the provision of a workable tube of predetermined diameter, wall thickness and metallic composition, compacting a ductile metallic mixture in the bore of said tube, hot rolling said tube and said mixture to reduced diameter and increased length, cold drawing said hot rolled assembly to further decrease the diameter and increase the length, said tube and said ductile metallic mixture when alloyed together forming a unitary non-ductile material.

References Cited in the file of this patent

UNITED STATES PATENTS

| | | |
|---|---|---|
| 1,825,829 | Stoody | Oct. 6, 1931 |
| 2,137,471 | Zublin | Nov. 22, 1938 |
| 2,247,829 | Ziegs | July 1, 1941 |
| 2,290,734 | Brassert | July 21, 1942 |
| 2,332,071 | Gordon | Oct. 19, 1943 |
| 2,334,609 | Cox | Nov. 16, 1943 |
| 2,435,800 | Sawhill | Feb. 10, 1948 |
| 2,442,087 | Kennedy | May 25, 1948 |
| 2,471,931 | Castro | May 31, 1949 |
| 2,493,143 | Ingels | Jan. 3, 1950 |
| 2,531,005 | Smith | Nov. 21, 1950 |
| 2,612,583 | Bernard | Sept. 30, 1952 |